US009459100B2

(12) United States Patent
Balachandran et al.

(10) Patent No.: US 9,459,100 B2
(45) Date of Patent: Oct. 4, 2016

(54) STEPPED SINUSOIDAL DRIVE FOR VIBRATORY GYROSCOPES

(71) Applicant: Robert Bosch GmbH, Stuttgart (DE)

(72) Inventors: Ganesh K. Balachandran, Sunnyvale, CA (US); Vladimir P. Petkov, San Jose, CA (US)

(73) Assignee: Robert Bosch GmbH, Stuttgart (DE)

( * ) Notice: Subject to any disclaimer, the term of this patent is extended or adjusted under 35 U.S.C. 154(b) by 237 days.

(21) Appl. No.: 14/283,940

(22) Filed: May 21, 2014

(65) Prior Publication Data

US 2015/0338217 A1    Nov. 26, 2015

(51) Int. Cl.
    *G01C 19/56*    (2012.01)
    *G01C 19/5776*  (2012.01)

(52) U.S. Cl.
    CPC .................. *G01C 19/5776* (2013.01)

(58) Field of Classification Search
    CPC ................ G01C 19/5776; G01C 19/5726
    USPC ............................................. 73/504.12
    See application file for complete search history.

(56) References Cited

U.S. PATENT DOCUMENTS 7,411,465 B2 * 8/2008 Watson ............... H03L 7/06
                                              73/504.12
2002/0020219 A1 * 2/2002 DeRoo ............ G01C 19/5719
                                              73/504.12

OTHER PUBLICATIONS

Geen, John A. et al., Single-Chip Surface Micromachined Integrated Gyroscope with 50°/h Allan Deviation, IEEE Journal of Solid-State Circuits, vol. 37, No. 12, Dec. 2002.
Prandi, Luciano et al., A Low-Power 3-Axis Digital-Output MEMS Gyroscope with Single Drive and Multiplexed Angular Rate Readout, IEEE International Solid-State Circuits Conference, 2011.

* cited by examiner

*Primary Examiner* — John Chapman, Jr.
(74) *Attorney, Agent, or Firm* — Maginot Moore & Beck LLP

(57) ABSTRACT

A gyroscopic sensor includes a vibratory gyroscopic sensor element, first and second drive electrodes positioned proximate to the vibratory gyroscopic sensor element, and a drive circuit operatively connected to the first and second drive electrodes. The drive circuit is configured to generate a stepped sinusoidal waveform having a plurality of steps, each step having a predetermined duration and each step having an output level in a plurality of predetermined output levels for the stepped sinusoidal waveform including at least three positive output levels and at least three negative output levels to generate oscillation of the vibratory gyroscopic sensor element at a predetermined frequency.

4 Claims, 4 Drawing Sheets

STEPPED SINUSOIDAL DRIVE FOR VIBRATORY GYROSCOPES

FIELD

This disclosure relates generally to the field of electronic sensors, and, more particularly, to gyroscopic sensors.

BACKGROUND

Micro electromechanical systems (MEMS) sensors are widely used in consumer and industrial devices. Gyroscopic sensors are one example of type of commonly deployed MEMS sensors. The small size and durability of MEMS gyroscopes enable incorporation of these sensors into mobile electronic devices, automotive and aerospace applications, robotics, cameras, and a wide range of other electronic and electromechanical devices.

A MEMS gyroscope typically includes a vibratory gyroscopic sensor element that oscillates along a first axis at a predetermined frequency. The vibratory sensor element is sometimes referred to as a proof mass and is modeled as a mass that oscillates along an axis to stretch and compress one or more springs. If the MEMS gyroscope experiences rotation, the angular acceleration of the rotation acts upon the MEMS gyroscope to change the position of the proof mass relative to the anchored frame of the MEMS along a sense axis that is perpendicular to the axis of oscillation for the proof mass. Thus, the rotation of the gyroscopic sensor results in a variation between the distance of the vibratory sensor element in the gyroscopic sensor and one or more capacitive sensor electrodes that are positioned in the sensor along the sense axis that is perpendicular to the oscillation axis. As is known in the art, a change in the distance that separates two plates in a capacitor changes the capacitance of the capacitor, and the motion of the vibratory sensor element along the sense axis changes the capacitance between the sensor element and the capacitive sensor electrodes. A sensing circuit detects the changes in capacitance to identify rotation of the gyroscopic sensor as the vibratory member in the gyroscopic sensor moves closer to or farther from the capacitive sensing elements that are positioned in the gyroscopic sensor.

In state of the art gyroscopic sensors, an external power source generates an electrical signal that drives the vibratory sensor element to sustain oscillation of the vibratory sensor element during operation of the gyroscopic sensor. The magnitude of the drive signal is much larger (often on the order of +/−1 V) than the sensed signal (often on the order of microvolts). Due to parasitic coupling between the drive electrodes and the sensing electrodes, the sense electrodes may detect the much larger amplitude drive signal, which is referred to as a "feed-through" signal, in addition to detecting the lower amplitude sensing signal. The feed-through signal is not desirable for detection by the sensing circuit because the magnitude of the feed-through signal is typically much larger than the sensing signal, which makes detection of the much smaller amplitude sensing signal difficult. While a constant level of feed-through can be tolerated in the detection of the sense signal, varying levels of feed-through caused by changes in the drive signal and by environmental factors around the gyroscopic sensor, such as temperature and mechanical stress, make detection of the sense signal difficult.

To reduce or eliminate feed-through, state of the art gyroscopic sensors generate the drive signal for the vibratory gyroscopic sensor element with a square waveform. The square waveform reduces feed-through because the magnitude of the drive signal only changes at the predetermined rising and falling edges of the square waveform. During the comparatively long period of time between the edges, the square wave has a substantially constant level that reduces the effects of feed-through.

While existing gyroscopic sensors are configured to reduce the effects of feed-through, the square wave signal that the drive circuit generates to maintain oscillation of the vibratory gyroscopic sensing element also produces multiple frequency harmonics. In some instances, the harmonics of the square wave signal induce oscillation of the vibratory sensor element at an unintended frequency. For example, a vibratory gyroscopic sensor element that has a resonant frequency of 25 KHz might vibrate at 50 KHz or 75 KHz due to the second and third harmonic of the drive signal. The higher frequencies of oscillation are referred to as parasitic modes and the gyroscopic sensor does not produce accurate output signals when operating in a parasitic mode. While some types of continuously varying drive signals avoid generating the harmonics of the square wave signals, the continuously varying drive signals reintroduce the feed-through noise because the time varying signal does not settle to a constant value in the same manner as the square wave. Consequently, modifications to gyroscopic sensors that improve the rejection of parasitic operating modes while also reducing or eliminating feed-through would be beneficial.

SUMMARY

In one embodiment, gyroscopic sensor that drives a vibratory gyroscopic sensor element with a stepped sinusoidal waveform to maintain oscillation of the vibratory gyroscopic sensor element at a predetermined frequency has been developed. The gyroscopic sensor includes a vibratory gyroscopic sensor element, first and second drive electrodes positioned proximate to the vibratory gyroscopic sensor element, and a drive circuit operatively connected to the first and second drive electrodes. The drive circuit is configured to generate a stepped sinusoidal waveform having a plurality of steps, each step having a predetermined duration and each step having an output level in a plurality of predetermined output levels for the stepped sinusoidal waveform including at least three positive output levels and at least three negative output levels to generate oscillation of the vibratory gyroscopic sensor element at a predetermined frequency.

In another embodiment, a method of operating a gyroscopic sensor has been developed. The method includes generating, with a drive circuit operatively connected to first and second drive electrodes that are positioned proximate to a vibratory gyroscopic sensor element, a stepped sinusoidal waveform having a plurality of steps, each step having a predetermined duration and each step having an output level in a plurality of predetermined output levels for the stepped sinusoidal waveform including at least three positive output levels and at least three negative output levels to generate oscillation of the vibratory gyroscopic sensor element at a predetermined frequency.

DETAILED DESCRIPTION

For the purposes of promoting an understanding of the principles of the embodiments described herein, reference is made to the drawings and descriptions in the following written specification. No limitation to the scope of the subject matter is intended by the references. The description also includes any alterations and modifications to the illustrated embodiments and includes further applications of the principles of the described embodiments as would normally occur to one skilled in the art to which this document pertains.

As used herein, the terms "stepped sinusoidal waveform" or "stepped sinusoidal signal" are used interchangeably and refer to a discrete-time periodic signal that approximates the waveform of a continuous-time sinusoidal signal using a predetermined number of discrete output levels. As used herein, the term "step" in the context of the stepped sinusoidal signal refers to a portion of the stepped sinusoidal signal that is generated for a predetermined period of time at a predetermined output level. In the embodiments depicted below, each step has a fixed time duration in the stepped sinusoidal output. As described below, a MEMS gyroscopic sensor includes a drive circuit that generates a stepped sinusoidal signal to drive a vibratory gyroscopic sensor element.

Figure 1:
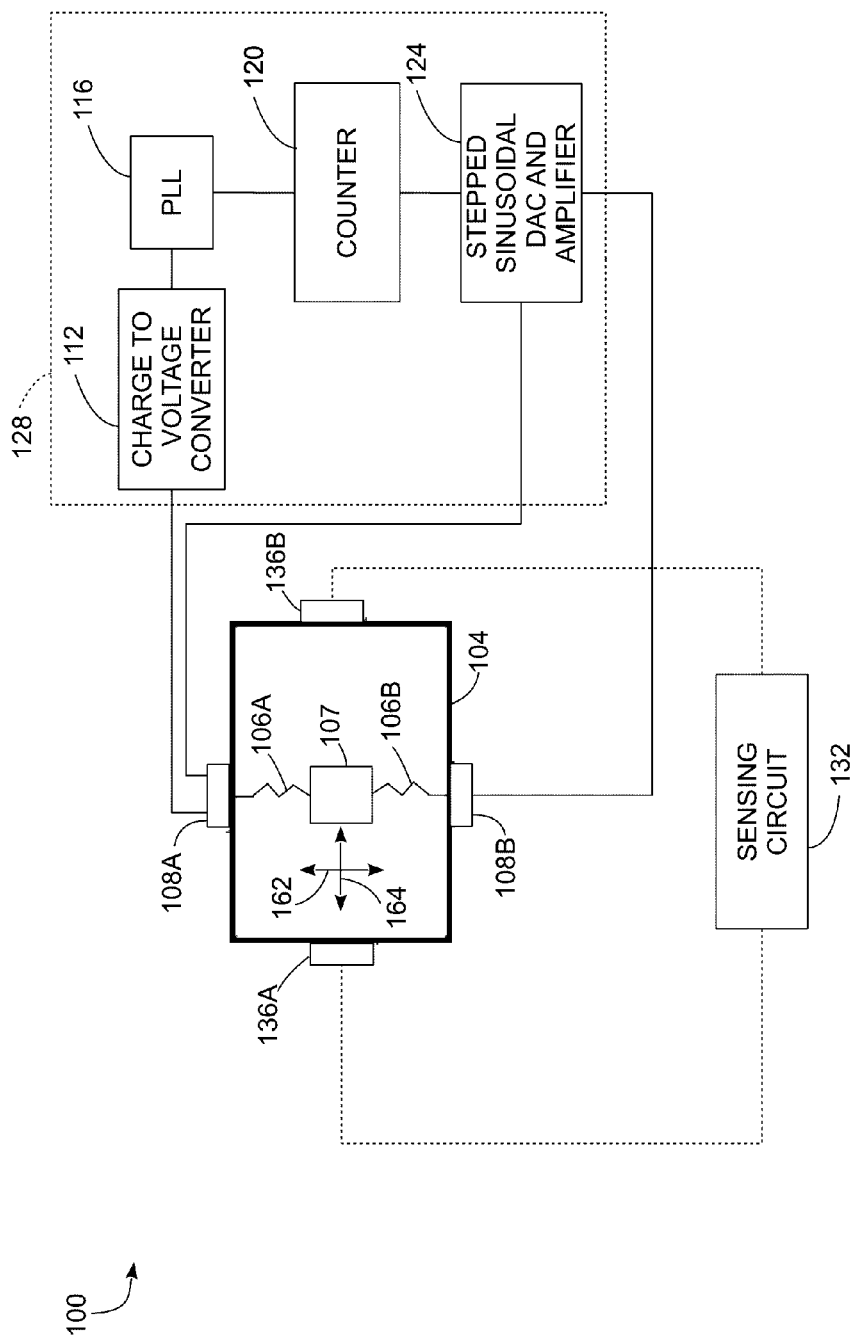
FIG. 1 is a block diagram of a MEMS gyroscopic sensor that drives a vibratory gyroscopic sensor element with a stepped sinusoidal waveform to maintain oscillation of the vibratory gyroscopic sensor element at a predetermined frequency.

FIG. 1 is a diagram of a MEMS gyroscopic sensor 100 that generates a stepped sinusoidal drive signal to sustain oscillation of a vibratory gyroscopic sensor element. The gyroscopic sensor 100 includes a vibratory gyroscopic sensor element 104, first and second drive electrodes 108A and 108B, respectively, a drive circuit 128, a sensing circuit 132, and first and second sensing electrodes 136A and 136B, respectively. As depicted schematically in FIG. 1, the sensing electrodes 136A and 136B are arranged along the sense axis that is perpendicular to the axis of oscillation in the vibratory gyroscopic sensor element 104. The vibratory gyroscopic sensor element 104 includes a proof mass 107 that is connected to a housing of the sensing element by springs 106A and 106B. During operation, the proof mass 107 oscillates along the oscillation axis 162 between the drive electrodes 108A and 108B. If the gyroscopic sensor experiences rotation, then the proof mass 107 moves along the sense axis 164 that is perpendicular to the oscillation axis 162, and the sensing circuit 132 detects corresponding changes to the capacitance between the proof mass and the sensing electrodes 136A and 136B. The illustrative embodiment of the sensor 100 includes a MEMS vibratory gyroscopic sensor element 104 that has a resonant frequency of 25 KHz. The MEMS vibratory gyroscopic sensor element 104 has a high Q factor that enables the vibratory gyroscopic sensor element 104 to act as a low-pass filter with a sharp drop off at frequencies above the 25 KHz frequency of vibration. The MEMS sensor element 104 includes a proof mass that oscillates between the first and second drive electrodes 108A and 108B at the 25 KHz resonant frequency and deflects from the axis of oscillation in a perpendicular direction between the sensing electrodes 136A and 136B. In some embodiments, the components in the gyroscopic sensor 100 are formed in an integrated circuit that incorporates the MEMS sensor element 104.

In the embodiment of FIG. 1, the drive circuit 128 further comprises a charge to voltage converter circuit 112, phase lock loop (PLL) circuit 116, digital counter 120, and a DAC 124 that is configured to generate a stepped sinusoidal drive signal for the vibratory gyroscopic sensor element. The charge to voltage converter 112 includes an input that is connected to at least one of the first and second drive electrodes 108A and 108B. The charge to voltage converter 112 is, for example, an operational amplifier or other suitable amplifier that generates a voltage signal output corresponding to the accumulated charge produced on the drive electrodes 108A and 108B. The measured charge on the drive electrodes 108A and 108B corresponds to the position of the proof mass in the vibratory gyroscopic sensor element 104 as the proof mass oscillates between the drive electrodes 108A and 108B. The charge to voltage converter 112 generates an output voltage signal that corresponds to the measured charge to identify the position of the proof mass during oscillation of the vibratory gyroscopic sensor element 104. The voltage signal from the charge to voltage converter 112 is typically a sinusoidal voltage waveform that is generated at the frequency of oscillation for the sensor element 104, such as 25 KHz in the sensor 100.

The PLL 116 is configured as a multiplier that generates a clock signal at a predetermined multiple of the sinusoidal voltage signal that the charge to voltage converter 112 produces with reference to the oscillation of the proof mass in the vibratory gyroscopic sensor element 104. Since the PLL 116 tracks the phase of the signal from the charge to voltage converter 112, the PLL 116 generates the higher frequency clock signal in phase with the oscillations of the vibratory gyroscopic sensor element 104. As depicted in more detail below, the PLL 116 is configured to generate a clock signal at a multiple of the frequency of oscillation for the vibratory gyroscopic sensor element 104 that corresponds to a number of steps in a stepped sinusoidal waveform that drives the sensor element 104. For example, in one embodiment depicted below the stepped sinusoidal waveform includes sixteen distinct output level steps during a single cycle. In other embodiments, the stepped sinusoidal waveform includes at least three positive output levels and at least three negative output levels. The PLL 116 generates the clock signal with a frequency at a multiple of sixteen times the frequency of the voltage signal from the charge to voltage converter 112. The output waveform from the PLL 116 in the illustrative embodiment of FIG. 1 is a square wave clock signal. Additionally, the PLL acts as a low pass filter and prevents the vibratory gyroscopic sensor element 104 from oscillating in one of the parasitic frequency modes instead of at the resonant frequency.

In the drive circuit 128, the counter 120 includes an input that receives the clock signal from an output of the PLL circuit 116 and generates a modulo digital counter value that increments for each cycle of the clock signal from the PLL 116. As used herein, the term modulo digital counter refers to a counter that includes a predetermined number of output values where the digital counter generates the output values in a predetermined order. The modulo digital counter returns to a first output value in the predetermined set of output values after generating each set of values one time. For example, in one embodiment of FIG. 1 the counter 120 is a 4-bit digital counter that generates a total of sixteen ($2^4$) output values on a predetermined scale (e.g. 0 to 15). In one embodiment, the counter 120 generates the digital output signal in the predetermined numeric order for the number of steps in the stepped sinusoidal waveform and the DAC 124 generates an output analog signal with electrical output levels that do not necessarily correspond directly to the numeric input values. For example, the stepped sinusoidal waveform with sixteen steps includes a total of nine discrete output levels, and the DAC 124 generates the nine discrete output levels using a predetermined relationship between the digital counter values (e.g. 0-15) and the output level that is associated with each digital output signal value. In another embodiment, the counter 120 generates the digital output signal with values that are generated in a predetermined order that corresponds to the stepped sinusoidal waveform. For example, instead of generating outputs 0 to 15 for a sixteen step signal, the counter 120 generates outputs 0, 1, 2, 3, 4, 3, 2, 1, 0, −1, −2, −3, −4, −3, −2, −1, or another equivalent set of output counter signals that correspond to the output levels from the DAC 124 for the output level of each step in the stepped sinusoidal waveform.

The DAC 124 includes an input that receives the digital counter output data from the counter 120. The DAC 124 generates a corresponding analog output voltage at a predetermined level to generate each step in the stepped sinusoidal waveform. In many embodiments, the DAC 124 includes one or more amplifiers that generate the stepped sinusoidal waveform with an amplitude that is sufficient to drive the vibratory gyroscopic sensor element 104. The DAC 124 generates an output in response to each counter value from the counter 120. Since the counter 120 increments in response to the clock signal from the PLL circuit 116, the DAC 124 generates each step in the stepped sinusoidal waveform for the predetermined time period for each step. In the example waveform depicted below in FIG. 3, the duration of each step corresponds to $\frac{1}{16}^{th}$ of the period of oscillation for the vibratory gyroscopic sensor element 104. The DAC 124 includes outputs that are connected to the first and second drive electrodes 108A and 108B.

Figure 2:
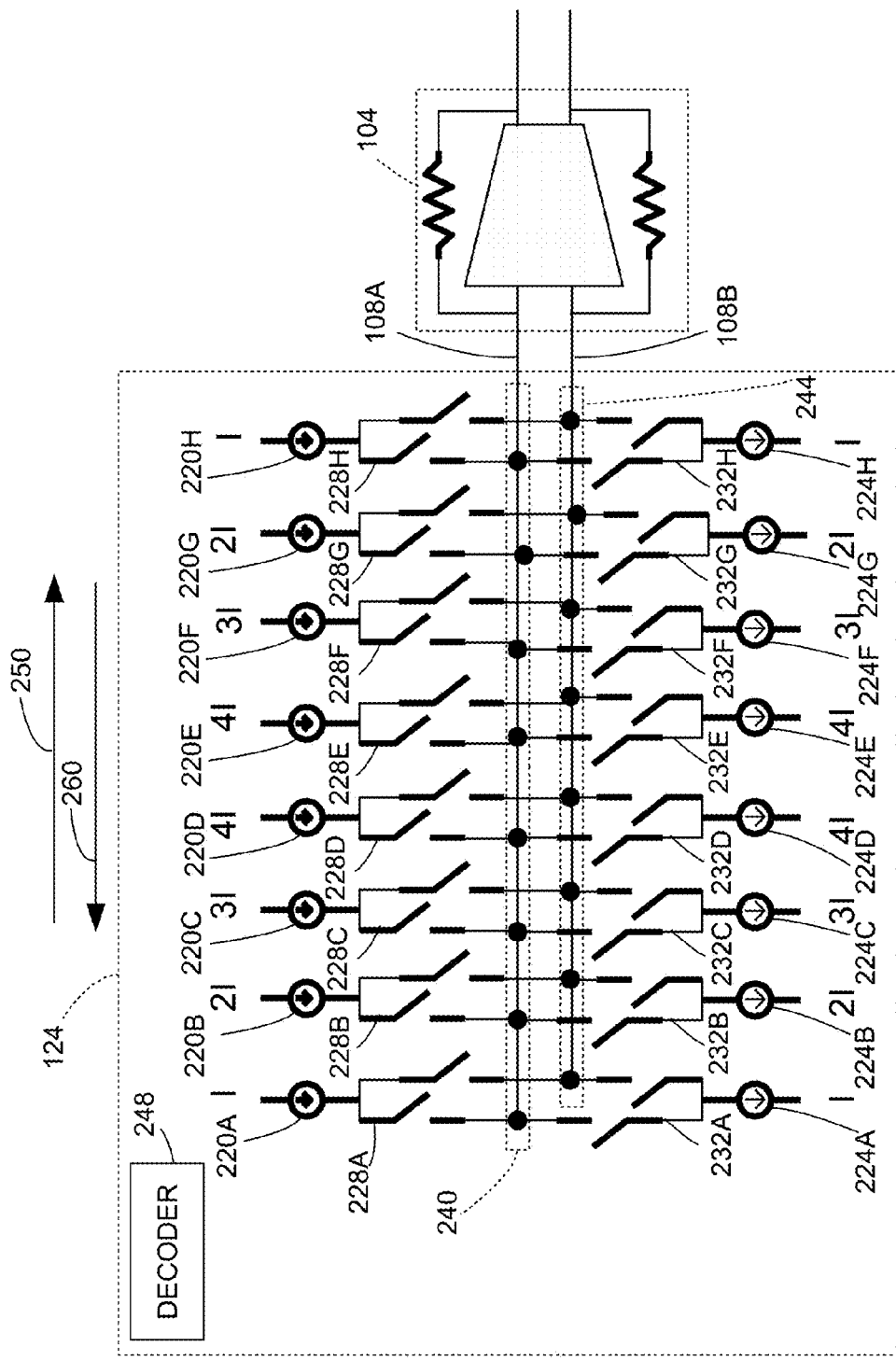
FIG. 2 is a schematic diagram of one embodiment of a digital to analog converter that is used in the gyroscopic sensor circuit of FIG. 1.

As described above, the DAC 124 generates the different step levels in the stepped sinusoidal drive signal for the drive electrodes 108A and 108B in the vibratory gyroscopic sensor element 104. While a wide range of DAC embodiments are suitable for use in the gyroscopic sensor 100, the stepped sinusoidal output waveform does not necessarily require complex DAC embodiments that incorporate reconstruction filters and other complex arrangements of current sources that are employed in DAC circuits. FIG. 2 depicts an embodiment of the DAC 124 that includes a plurality of positive and negative current sources and a switch network that generates the stepped sinusoidal output for the vibratory gyroscopic sensor element 104. In the embodiment of FIG. 2, the DAC generates different output levels for the steps in the stepped sinusoidal drive signal using different combinations of outputs from a first plurality of positive current sources 220A-220H and a second plurality of negative current sources 224A-224H. Each of the current sources has a predetermined output level, although the current sources are configured with different output levels. For example, the current sources 220A, 220H, 224A and 224H each generate current at a predetermined current level I that corresponds to the smallest increment between step levels in the step waveform for the drive signal. The remaining current sources generate larger magnitude currents such as 2I for the current sources 220B, 220G, 224B, and 224G, 3I for current sources 220C, 220F, 224C, and 224F, and 4I for current sources 220D-220E and 224D-224E.

The current sources 220A-220H are each connected to one of a positive output rail 240, negative voltage rail 244. Similarly, the current sources 224A-224H are each connected to one of a positive output rail 240, negative voltage rail 244, or to neither of the rails by a second plurality of switch pairs 232A-232H in the a switch network. The switches 228A-228H and 232A-232H in the switching network operate in response to the digital signal from the counter 120 to connect different combinations of the current sources 220A-220H and 224A-224H to the positive rail 240 and negative rail 244. Each of the switches 228A-228H and 232A-232H has two switching states in which the corresponding current source is connected to exactly one of the positive voltage rail 240 or negative voltage rail 244, and with the exception of an operationally negligible switching period each of the current sources 220A-220H and 224A-224H remains connected to one of the voltage rails 240 and 244 at all times during operation of the DAC 124.

The combination of current sources in each configuration of the DAC 124 generates one of the output levels associated with each step of the stepped sinusoidal waveform. The output from the DAC 124 is generated as a differential output signal that is relative to a maximum output amplitude level for the DAC 124. In the illustrative embodiment of FIG. 2, the maximum output is 40I, which corresponds to the sum of the current output levels for all of the current sources 220A-220H and 224A-224H. For example, to generate a 0.7 volt level output at level 364C in the graph 300, the switches 228A-228B and 232C-232H connect current sources 220A-220B and 224C-224H, respectively, to the negative voltage rail 244. The current sources are connected in parallel and the total current produces a sum of −17I (1I+2I+−2I+−3I+−4I+−4I+−3I+−2I+−1I=−17I). The remaining switches 228C-228H and 232A-232B connect current sources 220C-220H and 224A-224B, respectively, to the positive voltage rail 240 where the total current produces a sum of 17I (2I+3I+4I+4I+3I+2I+1I+−1I+−2I=17I). The total current sum is the difference between the positive and negative voltage rail in proportion to the maximum current output for all of the current sources:

$$\frac{17I - (-17I)}{40I} = \frac{34}{40} = 0.7.$$

Figure 3:
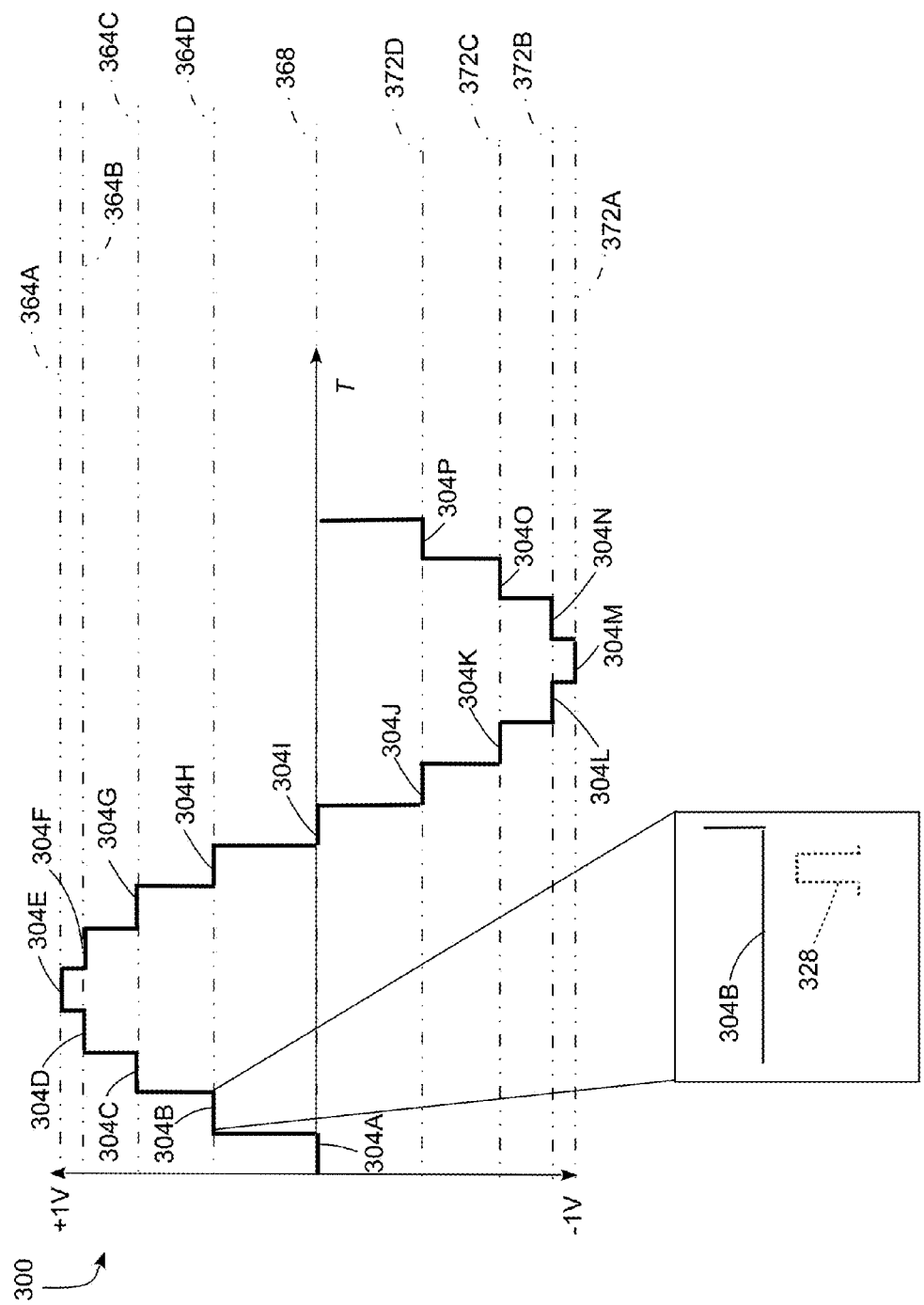
FIG. 3 is a diagram of a stepped sinusoidal square wave used in one embodiment of the MEMS gyroscopic sensor of FIG. 1.

In the example of FIG. 3 where the stepped waveform has an amplitude of +/−1 V, the differential ratio of 0.7 corresponds to an output step level of 0.7 V. The switches 228A-228H and 232A-232H in the switch network operate in a similar manner to adjust the relative differential output signal in for different output levels in the stepped waveform. The current magnitude scales that are associated with the current sources 220A-220H and 224A-224H are relative, and the absolute amplitude of the output sinusoidal waveform can be greater than or less than the +/−1V amplitude depicted in FIG. 3.

During operation, a decoder 248 in the DAC 124 receives the output from the counter 120 and generates control signals to operate the switches 228A-228H and 232A-232H in the switch network. In one configuration, the decoder 248 begins each cycle of the sinusoidal output at the positive peak level (step 304E in FIG. 3) by operating the switches 228A-228H to connect all of the positive current sources 220A-220H to the positive rail 240 and operating the switches 232A-232H to connect all of the negative current sources 224A-224H to the negative rail 244. To generate the descending stepwise sinusoidal output, the decoder 248 changes the connection of one of the switches 228A-228H as depicted by the arrow 250 and changes the connection of one of the switches 232H-232A as depicted by the arrow 260 for each step in the output. At zero output, the positive currents from the sources 220A-220H cancel the negative currents from the negative sources 224A-224H, and at maximum negative output the positive current sources 220A-220H are each connected to the negative rail 244 and the negative current sources 224A-224H are each connected to the positive rail 240. The decoder 248 continues to operate the switches in the reverse direction (arrow 250 for switches 232A-232H and direction 260 for switches 228H-228A) to generate the steps that increase the output level from the negative maximum amplitude to the positive maximum amplitude. The DAC 124 continues to generate the stepped sinusoidal drive waveform in a cyclical manner with reference to each output from the counter 120.

While the embodiment of FIG. 2 is configured to generate an output stepped sinusoidal waveform with sixteen discrete steps at a total of nine output voltage levels, which includes four positive voltage levels, four negative voltage levels and zero voltage, alternative configurations include additional current sources and switches to generate a greater number of output levels or fewer current sources and switches to generate a lesser number of output levels. Additionally, in alternative embodiments include a different configuration of current sources. For example, in one alternative embodiment that produces four discrete positive and negative output levels, four positive current sources generate the positive output levels and four separate negative current sources produce the four negative output levels. When not connected to the output, each of the current sources connected to ground or otherwise disconnected from the output instead of the differential output configuration that is depicted in FIG. 2. As described above, FIG. 2 is an illustrative example of a DAC that is suitable for use in generating a stepped sinusoidal drive signal for the gyroscopic sensor, but any other suitable DAC embodiment can be used in alternative embodiments.

FIG. 3 depicts a graph 300 of an example of a stepped sinusoidal waveform that the drive circuit 128 generates to drive the vibratory gyroscopic sensor element 104 in the gyroscopic sensor 100. The stepped sinusoidal waveform in the graph 300 includes sixteen steps 304A-304P. The stepped sinusoidal waveform repeats in a periodic manner after generating the sixteen steps. In the graph 300, the drive circuit 128 generates the stepped sinusoidal waveform beginning at zero voltage output (step 304A), increases positive voltage to a maximum output level in steps 304B-304E, decreases positive voltage back to zero voltage in steps 304F-304I, decreases voltage to a negative voltage peak in steps 304J-304M, and increases the voltage back to zero volts in steps 304N-304P.

In the graph 300, the steps 304A-304P are generated at nine different output levels including four positive voltage output levels 364A-364D, zero voltage level 368, and four negative voltage levels 372A-372D. In one embodiment, the peak positive level 364A at step 304E is +1 V and the peak negative voltage 372A at step 304M is −1 V. In the embodiment of FIG. 3, the drive circuit 128 generates successive steps with different changes in voltage magnitude to approximate a sinusoid with greater accuracy. For example, the graph 300 depicts the increase in voltage between steps 304A and 304B as being approximately 0.4 V between output levels 368 and 364D, while the increase in voltage between steps 304B and 304C is approximately 0.3 V between output levels 364D and 364C. The differences in the magnitude of voltage levels between steps in the stepped sinusoidal waveforms approximate rising and falling portions of a sinusoidal waveform.

During each step in the graph 300, the sensing circuit 132 in the gyroscopic sensor 100 samples the capacitance values at the sensing electrodes 136A and 136B to identify rotation in the gyroscopic sensor 100 due to deflection of the vibratory gyroscopic sensing element along the sense axis that is perpendicular to the axis of oscillation. In FIG. 3, the detailed view of the step 304A depicts a sensing period 328 when the sensing circuit 132 samples the signal from the sensing electrodes 136A and 136B. The sampling period 328 is typically substantially shorter than the duration of the step 304B. The sampling period 328 occurs closer to the end of each step to reduce the impact of noise in the vibratory gyroscopic sensing element 104 that occurs around each transition between the output levels of different steps in the stepped sinusoidal waveform. The predetermined time duration for each step in the stepped sinusoidal waveform in the gyroscopic sensor 100 is selected to be long enough for the transient noise that occurs during each step transition to settle prior to the sampling period for the sensing circuit 132 to enable the sensing circuit 132 to generate at least one sample during each step of the stepped sinusoidal drive signal.

During operation, the drive circuit 128 generates the stepped sinusoidal waveform to drive the vibratory gyroscopic sensor element 104. The stepped sinusoidal waveform produces fewer harmonics than the traditional square wave drive waveforms that are used in the prior art gyroscopic sensors. Additionally, during each step the output of the drive signal remains fixed at a substantially constant level to reduce or eliminate feed-through while the sensing circuit 132 samples the sensing electrodes 136A and 136B to identify rotation in the gyroscopic sensor 100.

Figure 4:
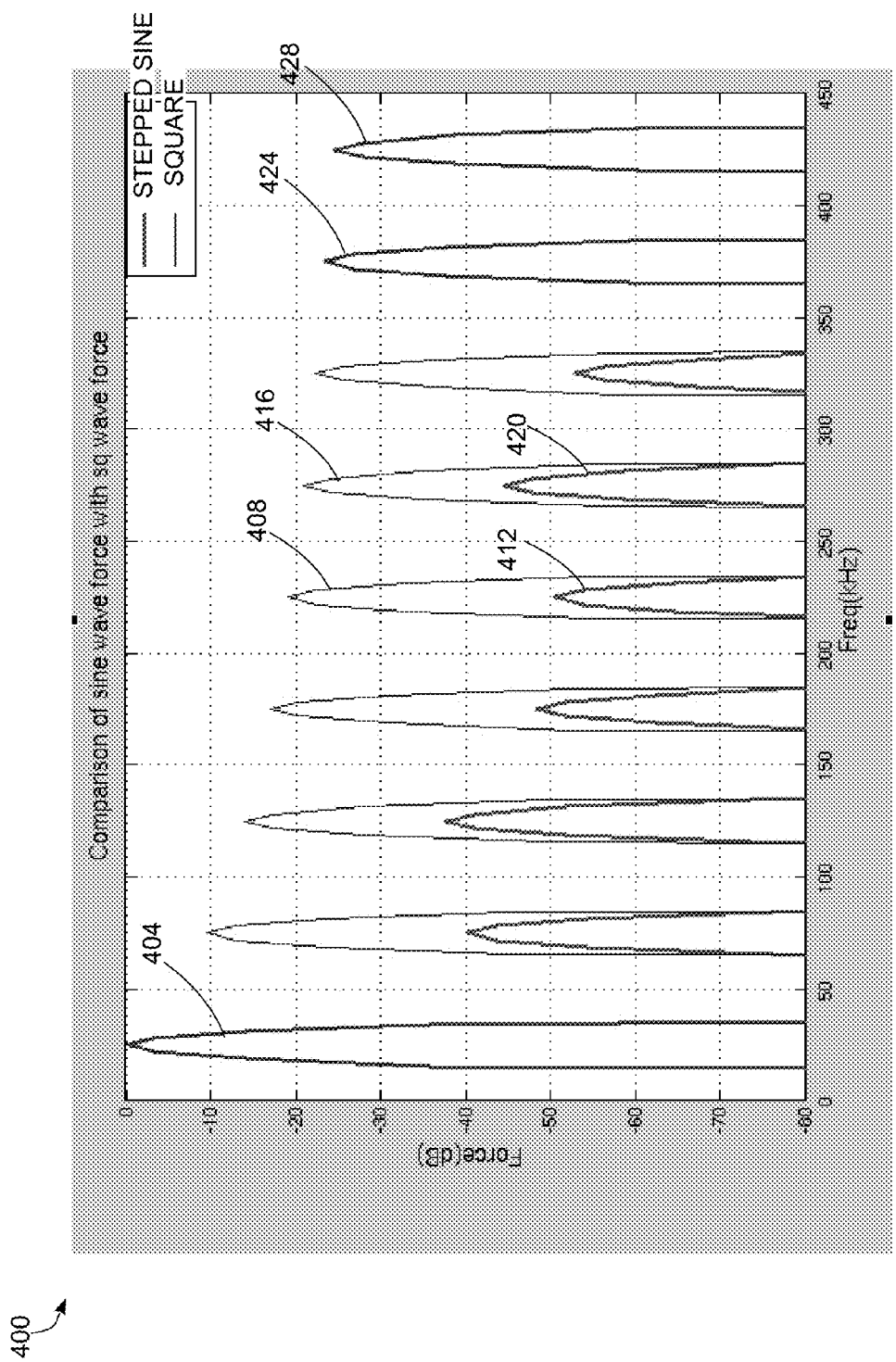
FIG. 4 is a graph that depicts force that is delivered to the proof mass in a vibratory gyroscopic sensor element at different frequencies using a prior art square wave compared to the stepped sinusoidal waveform used in the sensor of FIG. 1.

FIG. 4 depicts a graph 400 that illustrates the levels of force that a prior art square wave drive signal delivers to a vibratory gyroscopic sensor element in comparison to the stepped square wave drive signal that is described above. The graph 400 corresponds to the illustrative embodiment of the vibratory gyroscopic sensor element 104 in FIG. 1 that has a resonant frequency of 25 KHz. In the graph 400, the largest concentration of force from both the prior art drive signal and the stepped sinusoidal drive signal occurs at reference 404 and is centered on the 25 KHz resonant frequency of the vibratory gyroscopic sensor element 104. Both the prior art square wave and the stepped sinusoidal waveform deliver similar amounts of force at the resonant frequency. At many higher frequency harmonics, however, the stepped sinusoidal drive signal delivers substantially less force than the prior art square wave. For example, at a harmonic frequency of 225 KHz, the prior art square wave 408 delivers more than −20 dB of force to the vibratory gyroscopic sensor element 104, while the stepped sinusoidal waveform delivers roughly −50 dB of force (reference 412). Similarly, at 275 KHz the prior art square wave 416 delivers almost −20 dB of force while the stepped sinusoidal drive signal delivers only −45 dB of force (reference 420). Since the stepped sinusoidal waveform delivers lower levels force to the vibratory gyroscopic sensor element 104 at the higher frequency harmonics, the proof mass in the sensor element is much less likely to deviate from the resonant frequency at 25 KHz and oscillate at one of the higher harmonic frequencies in a parasitic operating mode.

In the graph 400, the stepped sinusoidal waveform delivers similar amounts of force to the prior art square wave at the harmonic that corresponds to the predetermined frequency for the generation of individual steps in the stepped sinusoidal waveform. In the example of the gyroscopic sensor 100, each cycle of the stepped sinusoidal waveform includes sixteen steps, which corresponds to a 25 KHz× 16=400 KHz harmonic. As depicted in the graph 400, the prior art square wave and stepped sinusoidal waveform deliver similar amounts of force to the harmonics 424 and 428 that are near 400 KHz. While the stepped sinusoidal waveform does not reduce the force that is delivered near the 400 KHz harmonic compared to the prior art square wave, the vibratory gyroscopic sensor element 104 is less likely to operate at the higher frequency 16× harmonic in a parasitic mode compared to the lower frequency harmonics (e.g. 2×, 3×, 4×, etc.). Additionally, during the design of the MEMS element, care could be taken to avoid parasitic modes at these frequencies. Whereas it is relatively easy not to have parasitic modes near a few specified frequencies, practical embodiments of MEMS sensors cannot be designed to avoid parasitic modes at all frequencies because when removal of one parasitic mode at a certain frequency for the MEMS element merely shifts the parasitic mode to another frequency. Thus, MEMS sensor elements and the drive circuit in the sensor are configured to operate with a frequency that avoids the inherent parasitic modes. The drive circuit 128 in the gyroscopic sensor 100 is configured with a number of steps that avoid the identified harmonics that are associated with the parasitic modes.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:
1. A gyroscopic sensor comprising:
a vibratory gyroscopic sensor element;
first and second drive electrodes positioned proximate to the vibratory gyroscopic sensor element; and
a drive circuit operatively connected to the first and second drive electrodes, the drive circuit being configured to generate a stepped sinusoidal waveform having a plurality of steps, each step having a predetermined duration and each step having an output level in a plurality of predetermined output levels for the stepped sinusoidal waveform including at least three positive output levels and at least three negative output levels to generate oscillation of the vibratory gyroscopic sensor element at a predetermined frequency, the drive circuit further comprising:
a charge to voltage converter having an input connected to at least one of the first and second drive electrodes, the charge to voltage converter generating a voltage signal with reference to an accumulation of charge on at least one of the first and second drive electrodes due to the oscillation of the vibratory gyroscopic sensor element;
a phase lock loop circuit having an input connected to an output of the charge to voltage converter, the phase lock loop circuit being configured to:
generate a clock signal with reference to the voltage signal from the charge to voltage converter; and
a digital counter configured to generate a plurality of digital output signals in a predetermined order with reference to the clock signal from the phase lock loop circuit;
a digital to analog converter (DAC) having an input connected to an output of the digital counter and configured to generate the plurality of steps in the stepped sinusoidal waveform, each step being generated with one output level in the plurality of predetermined output levels for the stepped sinusoidal waveform with reference to each digital output signal from the digital counter, the DAC comprising:
a plurality of positive current sources;
a plurality of negative current sources; and
a switch network operatively including a plurality of switches connected to the plurality of positive current sources and the plurality of negative current sources, the plurality of switches operating with reference to the digital output signals from the digital counter to connect predetermined current sources in the plurality of positive current sources and the plurality of negative current sources to the first and second drive electrodes to generate the plurality of output levels in the stepped sinusoidal waveform; and
the DAC being operatively connected to the first drive electrode and the second drive electrode to drive the oscillation of the vibratory gyroscopic sensor element with reference to the stepped sinusoidal waveform.

2. The gyroscopic sensor of claim 1, the drive circuit being configured to generate the stepped sinusoidal waveform at a frequency that corresponds to the predetermined frequency of oscillation for the vibratory gyroscope sensor element.

3. The gyroscopic sensor of claim 1 further comprising:
first and second sense electrodes positioned proximate to the vibratory gyroscopic sensor element;
a sensing circuit operatively connected to the first and second sense electrodes to identify motion of the vibratory gyroscopic sensor element along a sense axis that is perpendicular to an axis of the oscillation of the vibratory gyroscopic sensor.

4. The gyroscopic sensor of claim 1, the phase lock loop circuit being configured to generate the clock signal with a frequency that is a multiple of another frequency of the input voltage signal from the charge to voltage converter, the multiple of the output clock signal from the phase lock loop circuit corresponding to a number of the plurality of output levels in the stepped sinusoidal signal.

* * * * *